United States Patent
Jung et al.

(10) Patent No.: US 10,148,379 B2
(45) Date of Patent: Dec. 4, 2018

(54) METHOD FOR TRANSMITTING NETWORK ASSISTANCE INFORMATION FOR REMOVING INTERFERENCE AND SERVING CELL BASE STATION

(71) Applicant: LG ELECTRONICS INC., Seoul (KR)

(72) Inventors: Manyoung Jung, Seoul (KR); Sangwook Lee, Seoul (KR); Jinyup Hwang, Seoul (KR); Yoonoh Yang, Seoul (KR); Suhwan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 14/763,110

(22) PCT Filed: Feb. 7, 2014

(86) PCT No.: PCT/KR2014/001064
§ 371 (c)(1),
(2) Date: Jul. 23, 2015

(87) PCT Pub. No.: WO2014/123388
PCT Pub. Date: Aug. 14, 2014

(65) Prior Publication Data
US 2015/0358105 A1    Dec. 10, 2015

Related U.S. Application Data

(60) Provisional application No. 61/762,330, filed on Feb. 8, 2013.

(51) Int. Cl.
H04B 7/04 (2017.01)
H04J 11/00 (2006.01)
(Continued)

(52) U.S. Cl.
CPC ........ *H04J 11/0056* (2013.01); *H04B 7/0452* (2013.01); *H04L 1/0001* (2013.01);
(Continued)

(58) Field of Classification Search
CPC .. H04J 11/0056; H04B 7/0452; H04L 1/0001; H04L 5/0023; H04L 5/0073;
(Continued)

(56) References Cited

U.S. PATENT DOCUMENTS

2010/0099450 A1* 4/2010 Lu ..................... H04W 72/0406
455/501
2010/0255852 A1* 10/2010 Chen ................... H04W 72/082
455/450

(Continued)

FOREIGN PATENT DOCUMENTS

KR    10-2010-0127861 A    12/2010
KR    10-2012-0124337 A    11/2012
(Continued)

*Primary Examiner* — Ivan O Latorre
(74) *Attorney, Agent, or Firm* — Birch, Stewart, Kolasch & Birch, LLP

(57) ABSTRACT

One embodiment of the present specification provides a method for transmitting network support information in a serving cell in order to remove interference of a terminal. The method for transmitting the network support information comprises the steps of: enabling the serving cell to select a first terminal and a second terminal to which a multi-user multiple input multiple output (MU-MIMO) is applied; enabling the serving cell to select different codewords for a downlink data channel to the selected first and second terminals; enabling the serving cell to determine whether the first terminal can remove the interference; and transmitting, to the first terminal, the network support information for supporting the interference removal using the (Continued)

downlink data channel to the second terminal if the first terminal can remove the interference.

7 Claims, 14 Drawing Sheets

(51) Int. Cl.
| | | |
|---|---|---|
| H04L 5/00 | (2006.01) | |
| H04B 7/0452 | (2017.01) | |
| H04L 1/00 | (2006.01) | |
| H04W 72/04 | (2009.01) | |
| H04L 1/18 | (2006.01) | |

(52) U.S. Cl.
CPC .......... *H04L 5/0023* (2013.01); *H04L 5/0026* (2013.01); *H04L 5/0073* (2013.01); *H04L 1/005* (2013.01); *H04L 1/0031* (2013.01); *H04L 1/1896* (2013.01); *H04L 5/001* (2013.01); *H04L 5/0053* (2013.01); *H04L 5/0055* (2013.01); *H04W 72/048* (2013.01)

(58) Field of Classification Search
CPC ..... H04L 5/0026; H04L 1/005; H04L 1/0031; H04L 1/1896; H04L 5/0055; H04L 5/0053; H04L 5/001; H04W 72/048
See application file for complete search history.

(56) References Cited

U.S. PATENT DOCUMENTS

| | | | | |
|---|---|---|---|---|
| 2010/0309861 | A1* | 12/2010 | Gorokhov | H04B 1/7103 370/329 |
| 2011/0300892 | A1* | 12/2011 | Hakola | H04W 72/085 455/512 |
| 2012/0026955 | A1* | 2/2012 | Benjebbour | H04B 7/024 370/329 |
| 2012/0093089 | A1* | 4/2012 | Park | H04L 37/0417 370/328 |
| 2012/0213167 | A1* | 8/2012 | Xu | H04B 7/0413 370/329 |
| 2013/0005269 | A1* | 1/2013 | Lindoff | H04J 11/0026 455/63.1 |
| 2013/0044697 | A1* | 2/2013 | Yoo | H04W 72/082 370/329 |
| 2013/0089040 | A1* | 4/2013 | Tabet | H04L 5/0073 370/329 |
| 2013/0114447 | A1* | 5/2013 | Luo | H04B 1/7103 370/252 |
| 2013/0163530 | A1* | 6/2013 | Chen | H04W 72/04 370/329 |
| 2013/0196701 | A1* | 8/2013 | Tiirola | H04J 11/0026 455/501 |
| 2013/0203418 | A1* | 8/2013 | Jang | H04W 36/20 455/436 |
| 2014/0153499 | A1* | 6/2014 | Wang | H04W 24/02 370/329 |
| 2014/0204853 | A1 | 7/2014 | Ko et al. | |
| 2014/0256336 | A1* | 9/2014 | Manssour | H04L 1/0026 455/450 |
| 2015/0003360 | A1* | 1/2015 | Liu | H04L 5/001 370/329 |
| 2015/0139004 | A1* | 5/2015 | Fodor | H04W 72/082 370/252 |
| 2015/0148050 | A1* | 5/2015 | Siomina | H04J 11/005 455/452.1 |
| 2015/0295695 | A1* | 10/2015 | Davydov | H04W 72/12 370/329 |

FOREIGN PATENT DOCUMENTS

| | | |
|---|---|---|
| KR | 10-2012-0135223 A | 12/2012 |
| KR | 10-2012-0135871 A | 12/2012 |
| WO | WO 2009/121025 A2 | 10/2009 |
| WO | WO 2010/151067 A2 | 12/2010 |
| WO | WO 2011/099663 A1 | 8/2011 |

* cited by examiner

METHOD FOR TRANSMITTING NETWORK ASSISTANCE INFORMATION FOR REMOVING INTERFERENCE AND SERVING CELL BASE STATION

CROSS REFERENCE TO RELATED APPLICATIONS

This application is the National Phase of PCT International Application No. PCT/KR2014/001064, filed on Feb. 7, 2014, which claims priority under 35 U.S.C. 119(e) to U.S. Provisional Application No. 61/762,330, filed on Feb. 8, 2013, all of which are hereby expressly incorporated by reference into the present application.

BACKGROUND OF THE INVENTION

Field of the Invention

A disclosure of the present specification relates to a method for transmitting network assistance information and a serving cell base station.

Related Art

A 3rd generation partnership project (3GPP) long term evolution (LTE) that improves a universal mobile telecommunications system (UMTS) has been introduced to a 3GPP release 8. The 3GPP LTE uses an orthogonal frequency division multiple access (OFDMA) in a downlink and a single carrier-frequency division multiple access (SC-FDMA) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

Recently, the development of 3GPP LTE-advanced (LTE-A), which is an evolution of 3GPP LTE, has been being completed.

Meanwhile, in LTE/LTE-A, a Multi User-MIMO (MU-MIMO) scheme is used. In the MU-MIMO scheme, one cell uses two pieces of codeword in the same radio resource, which enables to transmit data different with each other to multiple user equipments simultaneously through different layers with each other.

However, in the MU-MIMO scheme, a codeword is used such that interference between UEs is minimized, but there is still interference. Accordingly, it is required to remove interference in order to increase the reception performance of UE.

SUMMARY OF THE INVENTION

Accordingly, in an aspect, an object of a disclosure of the present specification is to solve the problems.

Accordingly, an object of a disclosure of the present specification is to provide a method for effectively removing interference and a UE.

In order to achieve the aforementioned purpose, one disclosure of the present invention provides a method for transmitting network assistance information for allowing a terminal to cancel an interference. The method may performed by a serving cell and comprise: selecting, by a serving cell, a first terminal and a second terminal to which Multi-user Multiple Input Multiple Output (MU-MIMO) is applied; selecting, by the serving cell, code words different from each other for downlink data channels toward the first terminal and the second terminal respectively; determining, by the serving cell, whether the first terminal supports an interference cancellation; and transmitting the network assistance information for allowing the first terminal to cancel the interference caused by a downlink data channel toward the second terminal, if the first terminal supports the interference cancellation.

The determining step about whether the first terminal supports the interference cancellation may include: requesting a capability inquiry to the first terminal; and receiving capability information including information on whether the first terminal supports the interference cancellation.

The transmitting step of the network assistance information may include: determining on what network assistance information is to be transmitted according to a transmission mode.

If the transmission mode corresponds to a transmission mode 5, the network assistance information may include at least one of a wireless network temporary identifier of the second terminal, scheduling information on the second terminal, precoding codebook index information on the second terminal and power offset information. Here, the scheduling information on the second terminal may include at least one of hybrid automatic repeat request (HARQ) information, modulation and coding scheme, a new data indicator and a redundancy version.

If the transmission mode corresponds to a transmission mode 9, the network assistance information may include at least one of the wireless network temporary identifier of the second terminal and the scheduling information on the second terminal.

The network assistance information may include at least one of information on a search space for monitoring a Physical Downlink Control Channel (PDCCH) of the second terminal and the wireless network temporary identifier of the second terminal.

The method may further comprise: grouping the first terminal and the second terminal to which the MU-MIMO is to be applied; and allocating the wireless network temporary identifier as a unit of the group. The respective wireless network temporary identifier of the first terminal and the second terminal may be different as much as a predetermined offset.

In order to achieve the aforementioned purpose, one disclosure of the present invention also provides a serving cell base station for allowing a terminal to cancel an interference. The serving cell base station may comprise: a transceiver configured to transmit and receive wireless signals; and a processor configured to control the transceiver. The processor is configured to select a first terminal and a second terminal to which Multi-user Multiple Input Multiple Output (MU-MIMO) is applied; select code words different from each other for downlink data channels toward the first terminal and the second terminal respectively; determine whether the first terminal supports an interference cancellation; and transmit the network assistance information for allowing the first terminal to cancel the interference caused by a downlink data channel toward the second terminal, if the first terminal supports the interference cancellation.

Advantageous Effects

According to a disclosure of the present specification, a UE is able to perform Physical Downlink Shared Channel (PDSCH) interference cancellation without blind decoding by using network assistance information received from a serving cell, and consequently, complexity/amount of calculation can be significantly decreased.

DESCRIPTION OF EXEMPLARY EMBODIMENTS

Figure 1:
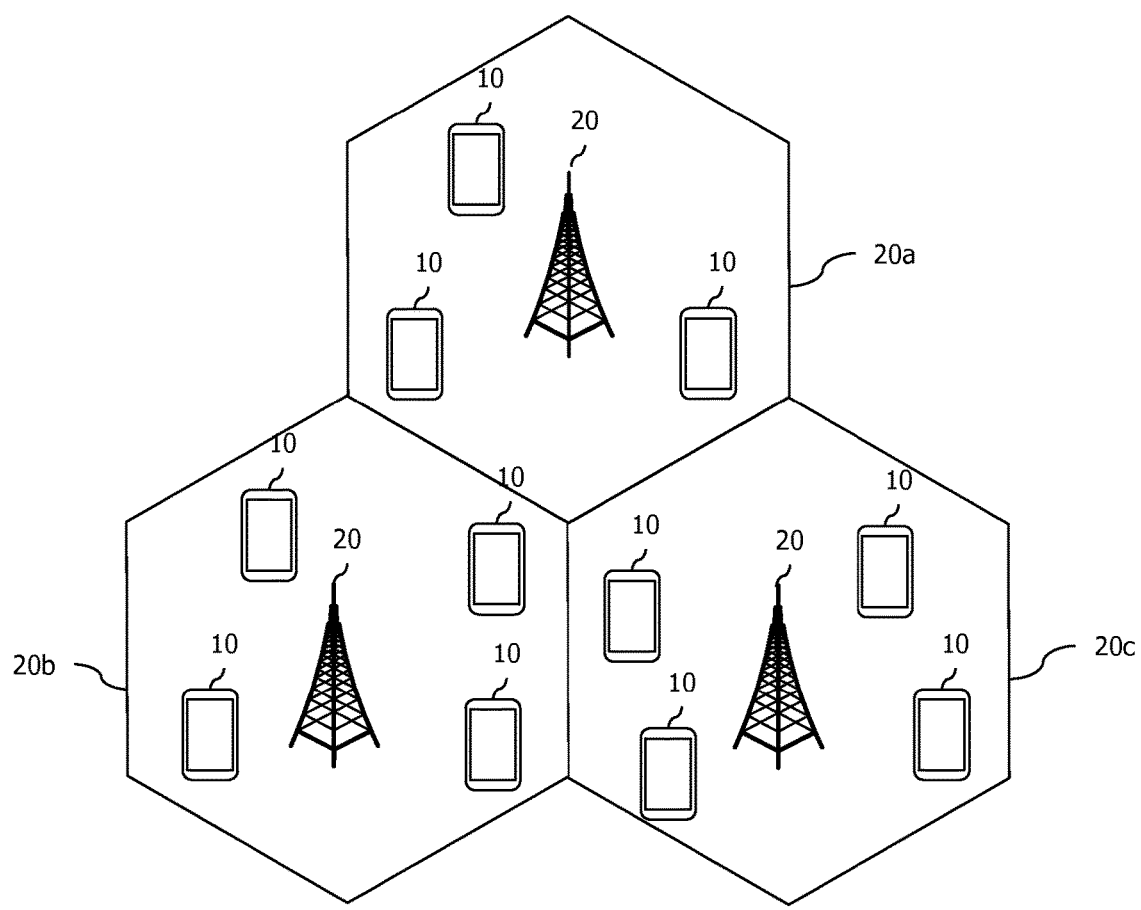
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

The wireless communication system 10 includes at least one base station (BS) 20. Respective BSs 20 provide a communication service to particular geographical areas 20a, 20b, and 20c (which are generally called cells). Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 201 generally refers to a fixed station that communicates with the UE 10 and may be called by other names such as evolved-NodeB (eNB), base transceiver system (BTS), access point (AP), etc.

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 2:
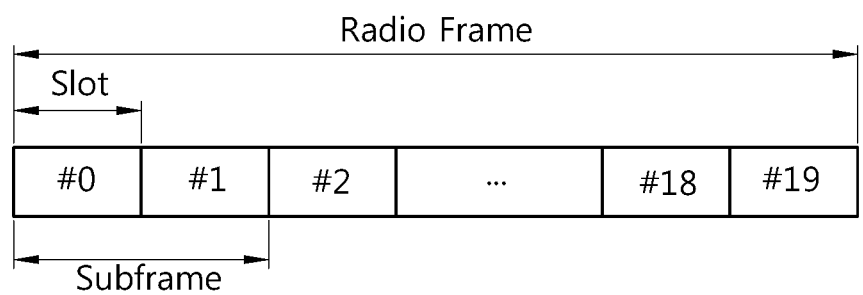
FIG. 2 illustrates the architecture of a radio frame according to FDD in 3GPP LTE.

FIG. 2 illustrates the architecture of a radio frame according to FDD in 3GPP LTE.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 3:
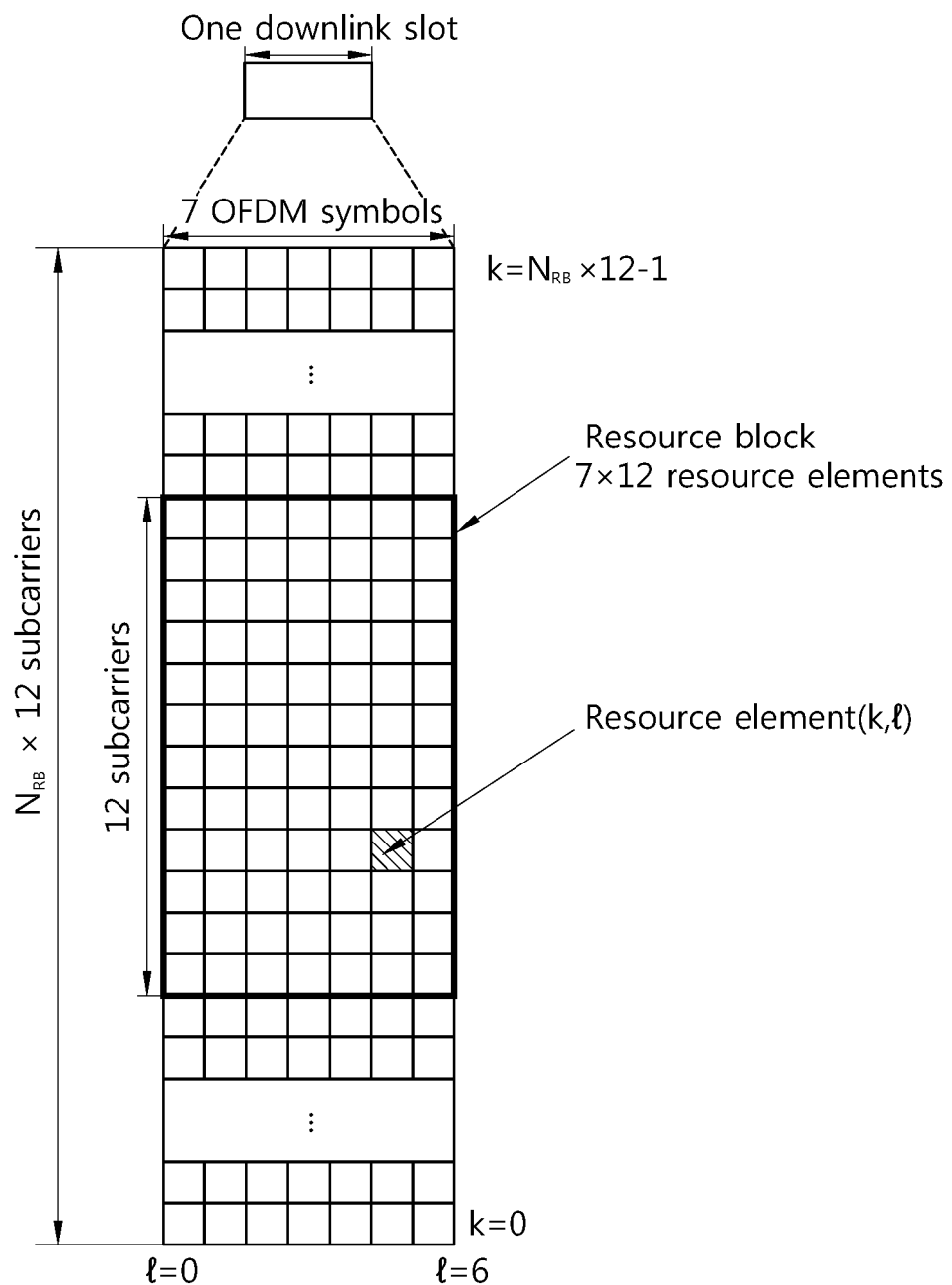
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 3 may also apply to the resource grid for the downlink slot.

Figure 4:
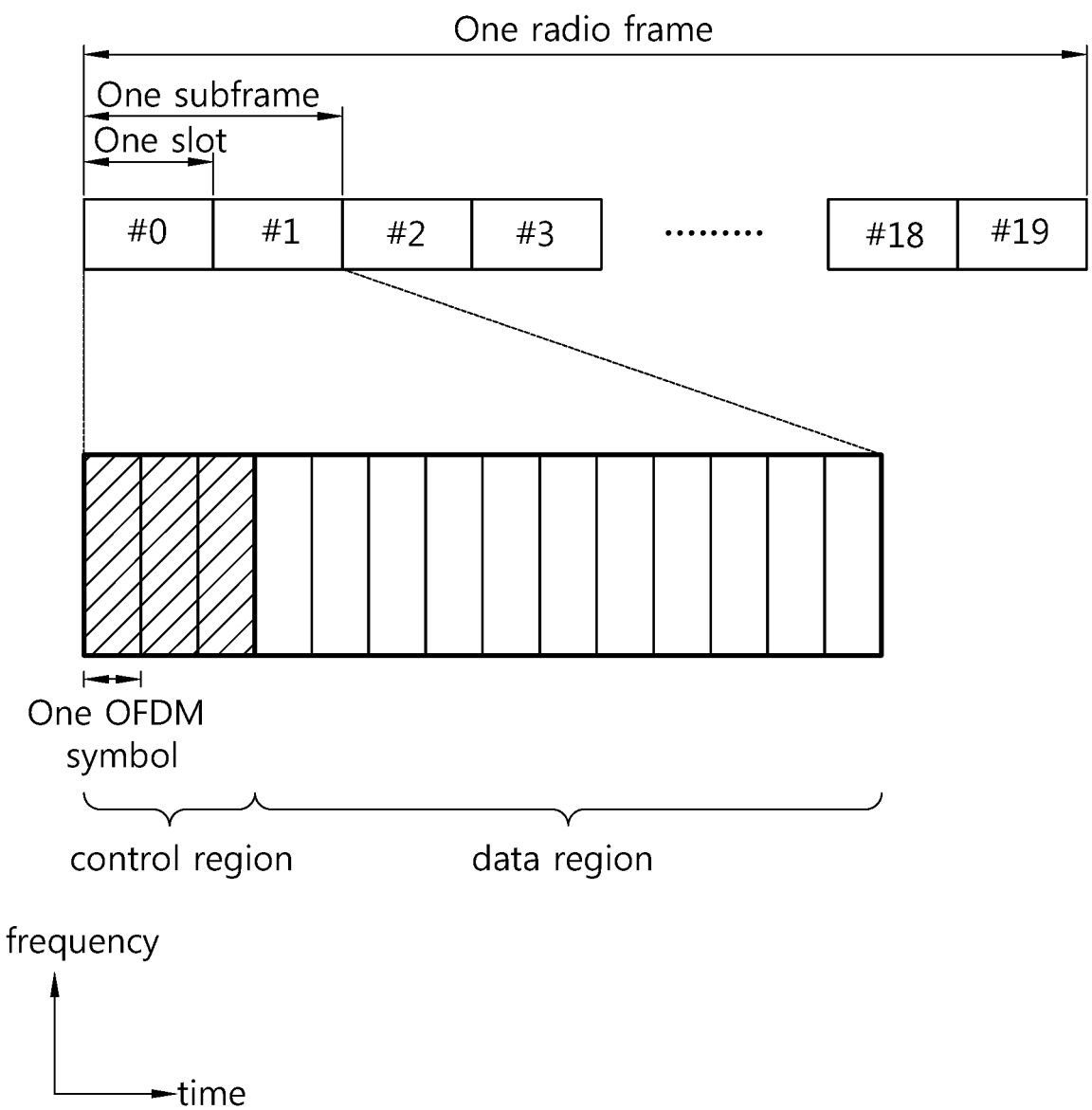
FIG. 4 illustrates the architecture of a downlink subframe.

FIG. 4 illustrates the architecture of a downlink sub-frame.

For this, 3GPP TS 36.211 V10.4.0 (2011 December) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 1

| Transmission mode | DCI format | Search space | Transmission mode of PDSCH according to PDCCH |
|---|---|---|---|
| Mode 1 | DCI format 1A | Common and UE-specific | Single antenna port, port 0 |
|  | DCI format 1 | UE-specific | Single antenna port, port 0 |
| Mode 2 | DCI format 1A | Common and UE-specific | Transmission diversity |
|  | DCI format 1 | UE-specific | Transmission diversity |
| Mode 3 | DCI format 1A | Common and UE-specific | Transmission diversity |
|  | DCI format 2A | UE-specific | CDD (Cyclic Delay Diversity) or Transmission diversity |
| Mode 4 | DCI format 1A | Common and UE-specific | Transmission diversity |
|  | DCI format 2 | UE-specific | Closed-loop spatial multiplexing |
| Mode 5 | DCI format 1A | Common and UE-specific | Transmission diversity |
|  | DCI format 1D | UE-specific | MU-MIMO(Multi-user Multiple Input Multiple Output) |
| Mode 6 | DCI format 1A | Common and UE-specific | Transmission diversity |
|  | DCI format 1B | UE-specific | Closed-loop spatial multiplexing |
| Mode 7 | DCI format 1A | Common and UE-specific | Single antenna port, port 0 if the number of PBCH transmission port is 1, otherwise Transmission diversity |
|  | DCI format 1 | UE-specific | Single antenna port, port 5 |
| Mode 8 | DCI format 1A | Common and UE-specific | Single antenna port, port 0 if the number of PBCH transmission port is 1, otherwise Transmission diversity |
|  | DCI format 2B | UE-specific | Dual layer transmission (port 7 or 8), or single antenna port, port 7 or 8 |

The use of DCI format is distinguished as represented in table below.

TABLE 2

| DCI format | Contents |
|---|---|
| DCI format 0 | Used for PUSCH scheduling |
| DCI format 1 | Used for scheduling one PDSCH codeword |
| DCI format 1A | Used for compact scheduling of one PDSCH codeword and random access procedure |
| DCI format 1B | Used for compact scheduling of one PDSCH codeword including precoding information |
| DCI format 1C | Used for very compact scheduling of one PDSCH codeword |
| DCI | Used for precoding and compact scheduling of one PDSCH |

TABLE 2-continued

| DCI format | Contents |
| --- | --- |
| format 1D | codeword including power offset information |
| DCI format 2 | Used for PDSCH scheduling UEs setup as closed-loop spatial multiplexing |
| DCI format 2A | Used for PDSCH scheduling UEs setup as open-loop spatial multiplexing |
| DCI format 3 | Used for transmitting PUCCH having 2 bit power adjustments and TPC command of PUSCH |
| DCI format 3A | Used for transmitting PUCCH having 1 bit power adjustments and TPC command of PUSCH |

According to 3GPP TS 36.211 V10.4.0, the uplink channels include a PUSCH, a PUCCH, an SRS (Sounding Reference Signal), and a PRACH (physical random access channel).

Figure 5:
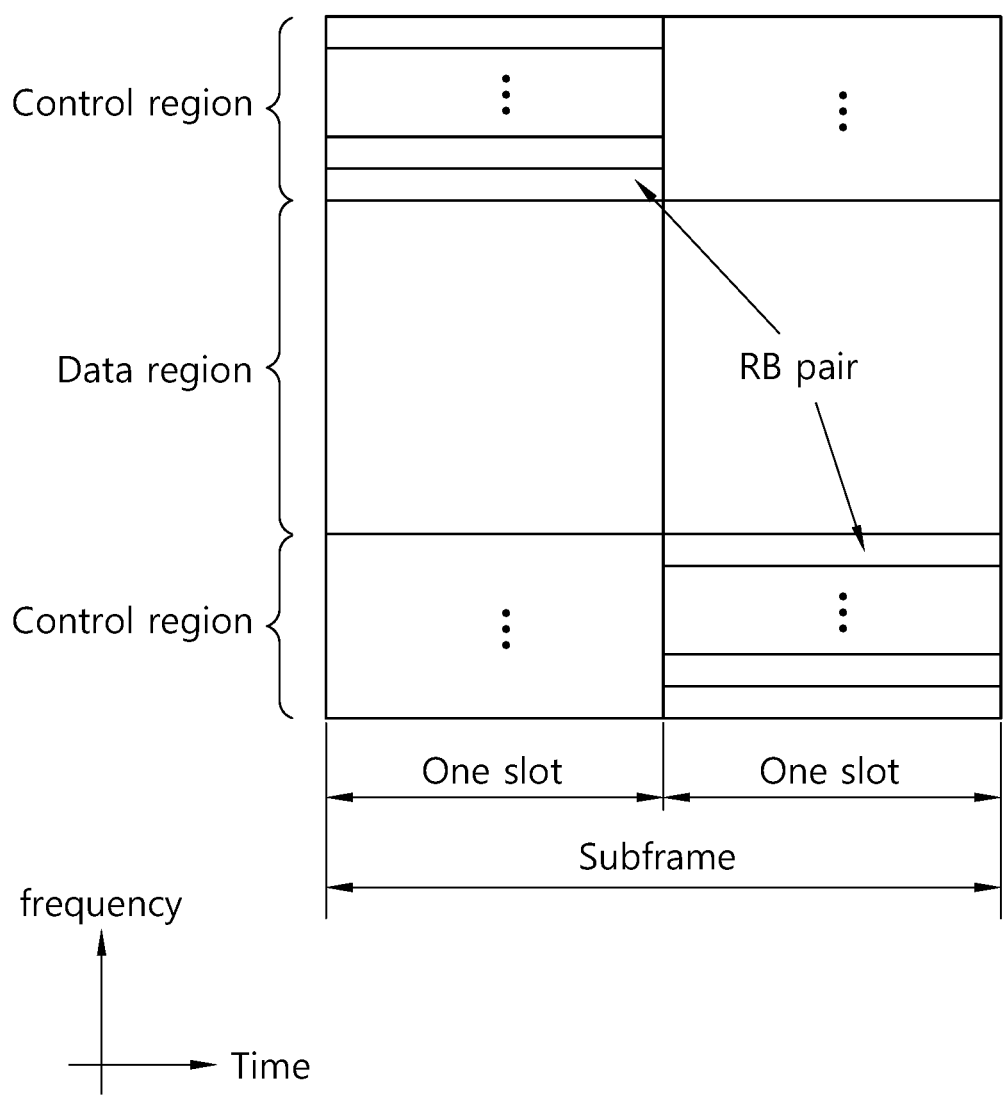
FIG. 5 illustrates the architecture of an uplink subframe in 3GPP LTE.

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 6:
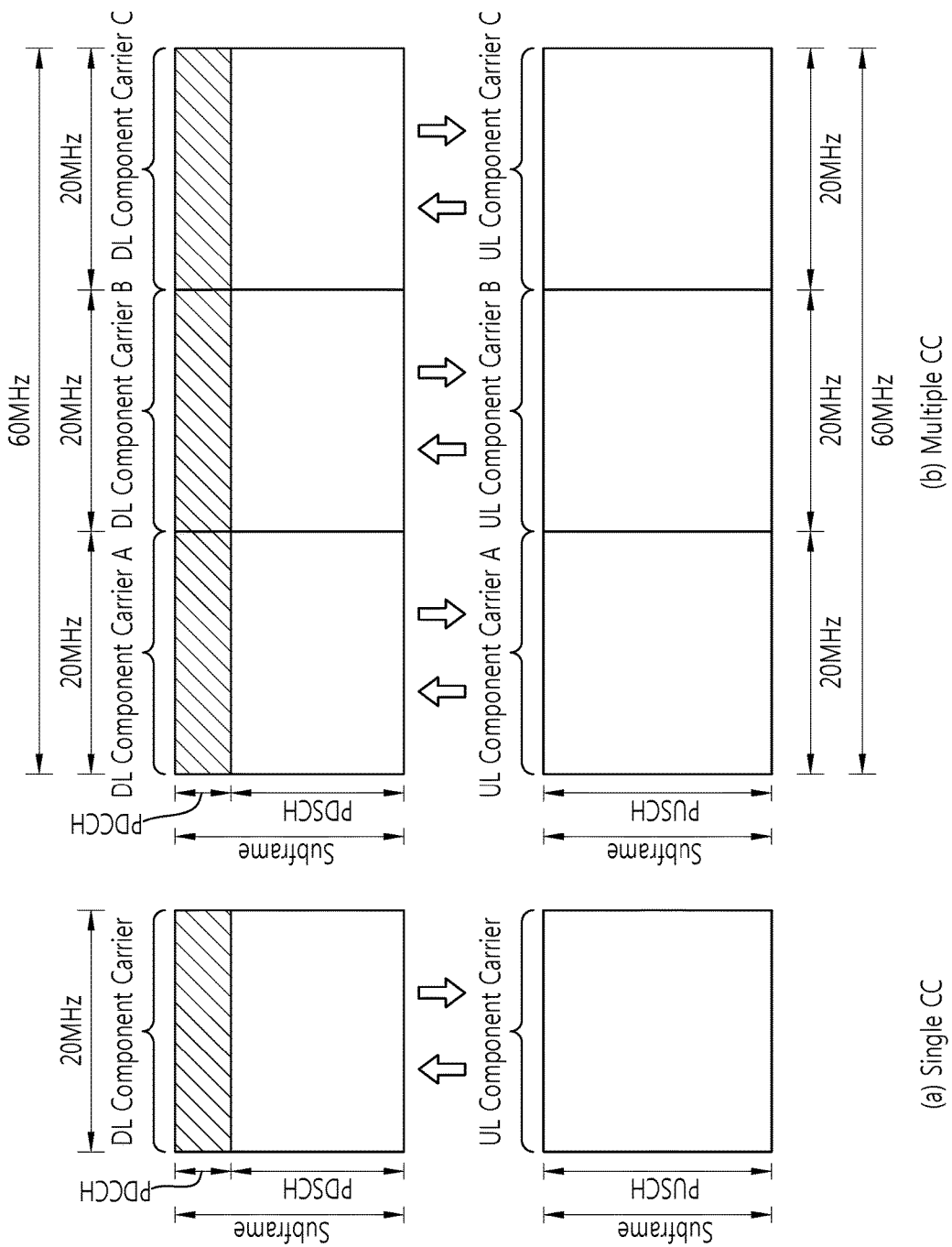
FIG. 6 illustrates an example of comparison between a single carrier system and a carrier aggregation system.

FIG. 6 illustrate an example of comparison between a single carrier system and a carrier aggregation system.

Referring to FIG. 6a, a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 6 primarily focuses on the FDD scheme for ease of description, the foregoing may be applicable to the TDD scheme by separating the radio frame for uplink/downlink in the time domain.

As shown in FIG. 6a, data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 6b may correspond to a communication example in an LTE-A system.

Referring to FIG. 6b, in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 6b illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz(UL CC1)+20 MHz(UL CC2)+20 MHz(UL CC3)+5 MHz(UL CC4), for example. However, without consideration of backward compatibility, a new bandwidth may be defined rather the existing system bandwidth being used, to constitute a broadband.

FIG. 6b illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell.

For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remain activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Meanwhile, the reference signal is hereinafter described.

Generally, transmission information, e.g., data, may be prone to be distorted or varied while transmitted through a wireless channel. Accordingly, a reference signal is required to demodulate the transmission information without errors. The reference signal is a signal previously known between the transmitter and the receiver and is transmitted together with transmission information. Since transmission information transmitted from the transmitter goes through a channel corresponding to each transmission antenna or layer, the reference signal may be allocated per transmission antenna or layer. The reference signal per transmission antenna or layer may be differentiated using resources, such as time, frequency, or code. The reference signal may be used for two purposes, i.e., demodulation and channel estimation of transmission information.

There may be two types of reference signals depending on the category of a receiver previously aware of a reference signal. The first reference signal is a reference signal that is known to only a particular receiver (e.g., a particular UE) and such reference signal is denoted a dedicated RS (DRS). The dedicated reference signal, in such meaning, is also referred to as a UE-specific RS. The second reference signal is a reference signal that is known to all the receivers in a cell, e.g., all the UEs, and such reference signal is denoted a common RS (CRS). The CRS is also denoted a cell-specific RS.

Further, reference signals may be classified depending on uses. For example, a reference signal used for data demodulation is denoted a demodulation RS (DM-RS). A reference signal used for feedback information indicating a channel state, such as CQI/PMI/RI, is denoted a CSI-RS (channel state indicator-RS). The DRS may be used as a DM-RS. It is hereinafter assumed that the DM-RS is a DRS.

Figure 7A:
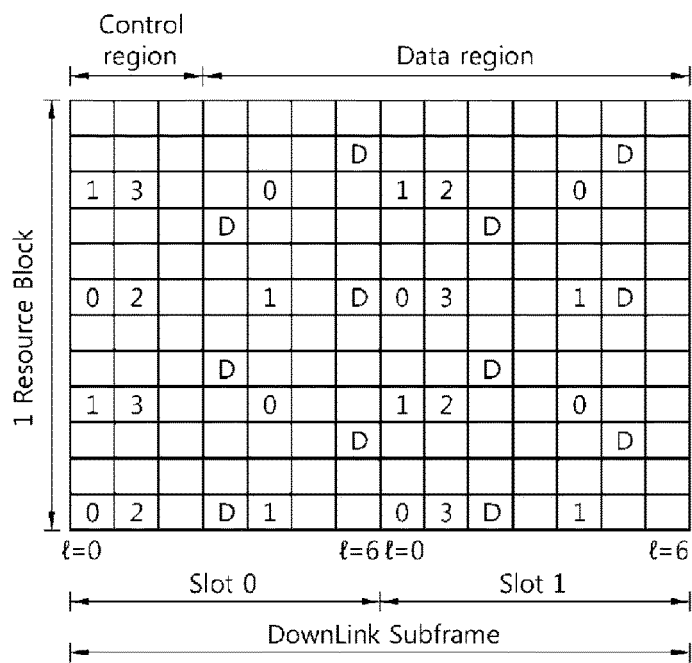
FIG. 7a illustrates an example of an RS structure that may support four antenna ports in normal CP.
Figure 7B:
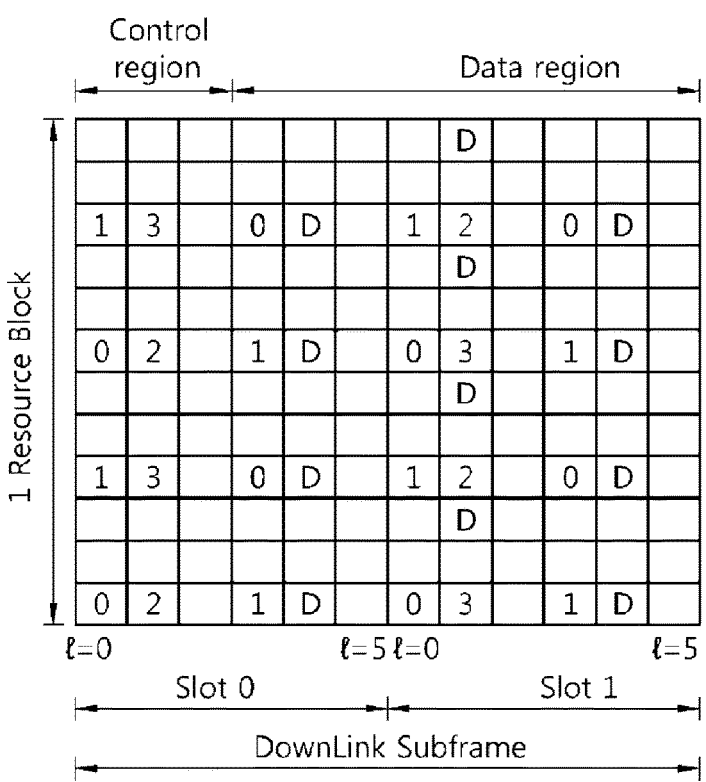
FIG. 7b illustrates an example of an RS structure that may support four antenna ports in extended CP.

FIG. 7a illustrates an example of an RS structure that may support four antenna ports in normal CP. FIG. 7b illustrates an example of an RS structure that may support four antenna ports in extended CP.

The RS structures of FIGS. 7a and 7b are RS structures used in a conventional 3GPP LTE system.

The resource element marked with one of 0 to 3 in FIGS. 7a and 7b denotes a resource element where a cell-specific reference signal, i.e., a common reference signal (CRS) is transmitted. Here, any one of 0 to 3 denotes a supported antenna port. That is, resource elements marked with p (p is any one of 0 to 3) mean resource elements to which a common reference signal for antenna port p is mapped. Such common reference signal is used to perform channel measurement and data demodulation on each antenna port. The common reference signal is transmitted in both the control region and the data region.

Resource elements marked with D in FIGS. 7a and 7b denote resource elements to which a UE-specific reference signal, i.e., a dedicated reference signal (DRS) is mapped. The UE-specific reference signal may be used single antenna port transmission of a PDSCH. The UE receives an indication as to whether a UE-specific reference signal is transmitted, and when a PDSCH is transmitted, whether the UE-specific reference signal is valid, through a higher layer signal. The UE-specific reference signal may be transmitted only when data demodulation is needed. The UE-specific reference signal may be transmitted only in the data region.

<Inter-Cell Interference>

Meanwhile, hereinafter, the inter-cell interference will be described.

The inter-cell interference is referred to a situation of interference being occurred between cells when coverage is overlapped among cells in order to settle a radio shadow area.

In the most fundamental method for solving such an interference problem, different frequencies are used between cells. However, since a frequency is a rare and expensive resource, a method of solving the problem by using a frequency division is not much welcomed by a vendor.

Accordingly, in 3GPP, such an inter-cell interference problem is to be solved through a time division manner.

According to this, recently, as one of interference corporation methods, vigorous researches for enhanced inter-cell interference coordination (eICIC) have been progressed.

The time division method introduced in LTE release-10 is called an enhanced ICIC (inter-cell interference coordination) in a sense that it is more enhanced than the conventional frequency division method. In this method, an interfering cell is called an aggressor cell or a primary cell, and an interfered cell is defined as a victim cell or a secondary cell. The aggressor cell or the primary cell stops a data transmission in a specific subframe, and a UE is allowed to maintain a connection with the victim cell or the secondary cell in the corresponding subframe. That is, in this method, if heterogeneous cells co-exist, one cell temporarily stops signal transmission as to a UE which experiences a significantly high interference in a certain area, so that an interference signal is almost not sent.

Meanwhile, a specific subframe in which the data transmission stops is called an ABS (almost blank subframe). No data is transmitted other than essential control information in a subframe corresponding to the ABS. For example, the essential control information is a CRS (cell-specific reference signal). In the current 3GPP LTE/LTE-A standard, the CRS signal exists only in OFDM symbols #0, #4, #7, and #11 in each subframe on a time axis. Accordingly, in the subframe to which the ABS is applied, only the CRS signal is transmitted on the OFDM symbols #0, #4, #7, and #11.

Figure 8A:
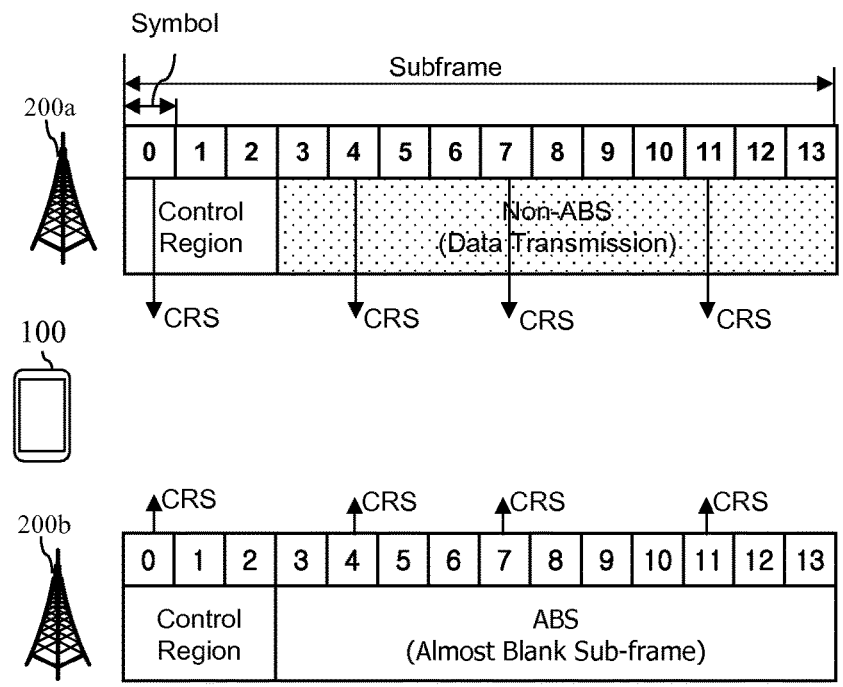
FIG. 8a illustrates enhanced inter-cell interference coordination (eICIC) for solving inter-base station interference.

FIG. 8a illustrates enhanced inter-cell interference coordination (eICIC) for solving inter-base station interference.

Referring to FIG. 8a, the first eNodeB 200a performs data transmission in the data region of a subframe which is depicted, and the CRS signal is transmitted on the symbols #0, #4, #7 and #11.

At the moment, the second eNodeB 200b operates the shown subframe as the ABS.

That is, when the eICIC is applied to the second eNodeB 200b, the corresponding subframe is operated according to the ABS, and no data may be transmitted in the data region. However, in the subframe which is operated according to the ABS, only the CRS is transmitted on the OFDM symbols #0, #4, #7, and #11.

Figure 8B:
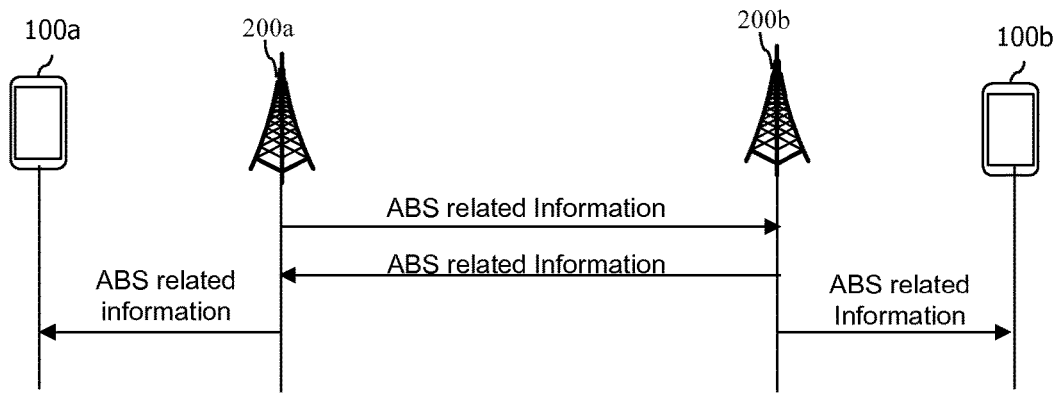
FIG. 8b illustrates an example of exchanging the ABS subframe related information.

FIG. 8b illustrates an example of exchanging the ABS subframe related information.

As we can know by referring to FIG. 8b, through the X2 interface, the ABS related information may be exchanged between the first eNodeB 200a and the second eNodeB 200b, respectively.

In addition, the first eNodeB 200a and the second eNodeB 200b may deliver the ABS related information to their serving UEs 100a/100b, respectively.

The first eNodeB 200a and the second eNodeB 200b may configure the measurement subset for the serving UE 100a/100b its own and deliver it based on at least one of their ABS related information and the ABS related information of the counterpart.

On the downlink subframe configured as the ABS, since the corresponding cells 200a/200b do not transmit the downlink signal at all or transmit the downlink signal with decreased power, the size of interference influences within the coverage of different cell may become smaller. As such, since the size of interference may be different on whether the corresponding subframe is configured as the ABS, the UE 100 performs the measurement only on a specific subframe which is predefined.

For this, each of the cells 200a/200b may instruct the serving UEs 100a/100b of its own to perform the measurement only on the specific subframe based on at least one of their ABS related information and the ABS related information of the counterpart. This is called a restricted measurement. The instruction may be delivered through higher layer signaling. The higher layer signaling may be a RRC signal. The signal may be a CQI-ReportConfig element.

The ABS related information may include ABS information and an ABS status.

First, the ABS information may include one or more of information elements shown in the following table for example. The ABS pattern information is information which represents a subframe to be used as an ABS in a bitmap format. It may be configured with a bitmap of 40 bits in case of FDD and up to 70 bits in case of TDD. For example, in FDD, the 40 bits indicate 40 subframes, and if a bit value is 1, it indicates an ABS, and if the bit value is 0, it indicates a non-ABS subframe. A measurement subset is a subset of ABS pattern information, and is configured with a bitmap of 40 bits in the FDD case and up to 70 bits in the TDD case. Such a measurement subset is to configure a restricted measurement to a corresponding UE.

TABLE 3

| IE | Description |
| --- | --- |
| ABS Pattern Info | At each position of the bitmap, a value "1" indicates 'ABS', and a value "0" indicates 'non-ABS'. A first position of the ABS pattern corresponds to subframe 0 in a radio frame where SFN = 0. The |

TABLE 3-continued

| IE | Description |
| --- | --- |
| | ABS pattern is continuously repeated in all radio frames. The maximum number of subframes is 40. |
| Measurement Subset | It indicates a subset of the ABS Pattern Info, and is used to configure specific measurements for the UE. |
| ABS Inactive | It indicates that interference coordination by means of ABS is not active. |

Next, the ABS status is used to allow a corresponding cell to determine whether to change an ABS pattern. Usable ABS pattern information is a subset of ABS pattern information, and also consists of a bitmap. The Usable ABS pattern information indicates whether a subframe designated as an ABS is properly used for a purpose of an interference mitigation. The downlink ABS status is a ratio of the number of downlink resource blocks (RBs) scheduled in a subframe indicated in the usable ABS pattern information and RBs allocated for a UE which must be protected using the ABS, and indicates how effectively the ABS is utilized in a victim cell according to an original purpose.

TABLE 4

| IE | Description |
| --- | --- |
| DL ABS status | Percentage of used ABS resources. The numerator of the percentage consists of resource blocks within the ABS indicated in the Usable ABS Pattern Info, and the denominator of the percentage is the total number of resource blocks within the ABS indicated in the Usable ABS Pattern Info. |
| Usable ABS Pattern Info | Each position in the bitmap represents a subframe. A value "1" indicates 'ABS' designated as being protected from inter-cell interference, and a value "0" is used for all other subframes. The pattern represented by the bitmap is a subset of, or the same as, the corresponding ABS Pattern Info. |

A measurement subset consisting of a subset of the ABS pattern information is a subframe used as an ABS. Other subframes may autonomously determine whether a corresponding cell is utilized as an ABS according to a traffic load.

As described so far, in addition to the solution of the inter-cell interference problem through the eICIC technique, the method of adding an interference cancellation function to the UE 100 has been discussed in Rel-11 standard by expending the eICIC.

<MIMO (Multiple-Input Multiple-Output)>

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 9:
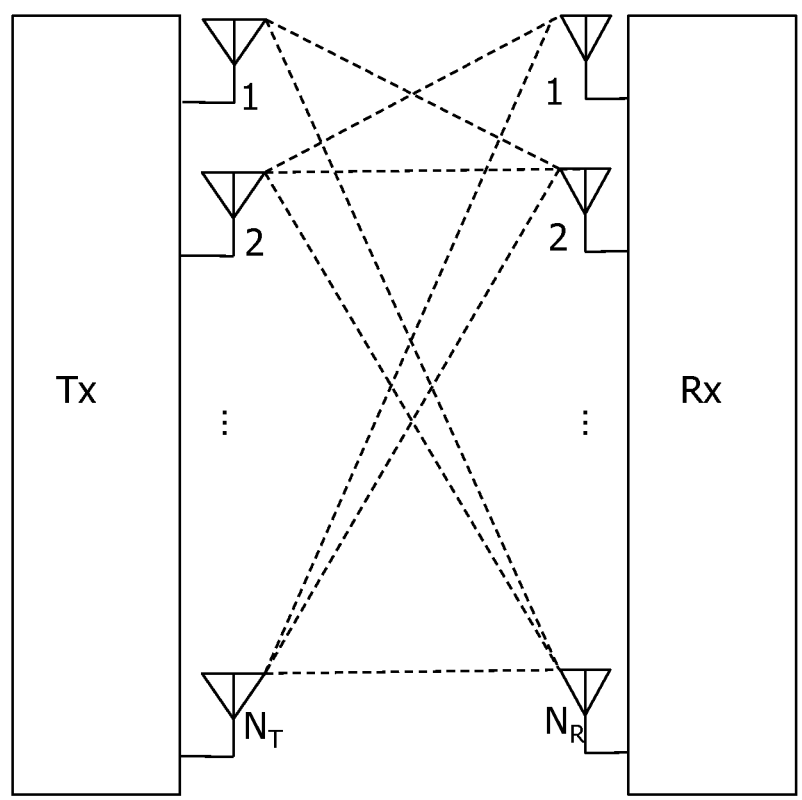
FIG. 9 illustrates a general multiple antenna system.

FIG. 9 illustrates a general multiple antenna system.

As shown in FIG. 9, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below.

$$R_i = \min(N_T, N_R) \quad \text{[Equation 1]}$$

The transmission information may include up to NT different pieces of information when the number of transmission antennas is NT. In this case, the transmission information may be represented as in Equation 2.

$$s = [s_1, s_2, \ldots, s_{N_T}]^T \quad \text{[Equation 2]}$$

In Equation 2, s refers to a transmission information vector, and s1, s2, . . . , sNT represent the respective elements of transmission information vectors. Each information may be transmitted having a different transmission power. When the respective transmission powers are represented as (P1, P2, . . . , PNT), a transmission information vector to which a transmission power is applied may be represented as in Equation 3.

$$\hat{s} = [\hat{s}_1, \hat{s}_2, \ldots, \hat{s}_{N_T}]^T = P_1 s_1, P_2 s_2, \ldots, P_{N_T} s_{N_T}]^T \quad \text{[Equation 3]}$$

Equation 3 may be represented as the product of a transmission power diagonal matrix and a transmission information vector as in Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Transmission signals (x1, x2, . . . , xNT) that are actually transmitted through NT transmission antennas are generated by multiplying a transmission information vectors ŝ to which transmission power is applied by a weight matrix W. The weight matrix W functions to properly distribute transmission informations to individual antennas depending on transmission channel conditions. Assuming that a transmission signal vector is x, the following equation may be obtained.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, an element in the weight matrix, wij (1≤i≤NT, 1≤j≤NT), represents a weight for an ith transmission antenna and a jth transmission information. The weight matrix W is also denoted a precoding matrix.

A transmission signal vector may include different transmission informations depending on transmission schemes. For example, when spatial diversity, i.e., transmission diversity, applies, transmission informations of the transmission signal vectors may be all the same. That is, [s1, s2, . . . , snT] may be all the same information, e.g., [s1, s1, . . . , s1]. Accordingly, since the same transmission informations are transferred to the receiver through different channels, a diversity effect occurs, and the transmission may be more reliable.

Or, when spatial multiplexing applies, the transmission informations of the transmission signal vectors may be different. That is, s1, s2, . . . , snT may be all different. Since different transmission informations are transmitted to the receiver through different channels, the amount of information to be transmitted may be increased.

Of course, transmission informations may be transmitted using both spatial diversity and spatial multiplexing. That is, in the above example, the same informations may be transmitted by spatial diversity through three transmission antennas, and different informations may be transmitted through spatial multiplexing through the remaining transmission antennas. In such case, the transmission information vectors may be configured as, e.g., [s1, s1, s1, s2, s3 . . . , snT−2].

When the receiver has NR reception antennas, a signal received by an individual reception antenna may be represented as yn(1≤n≤NR). In this case, a reception signal vector y may be represented as in the following equation.

$$y = [y_1, y_2, \ldots, y_{N_R}]^T \quad \text{[Equation 6]}$$

When channel modeling is performed in a MIMO system, each channel may be differentiated from another by an index of a transmission antenna and an index of a reception antenna. When the index of the transmission antenna is j, and the index of the reception antenna is i, the channel between the transmission antenna and the reception antenna may be represented as hij. (it should be noted that the index of the reception antenna comes before the index of the transmission antenna in the subscript indicating the channel).

Figure 10:
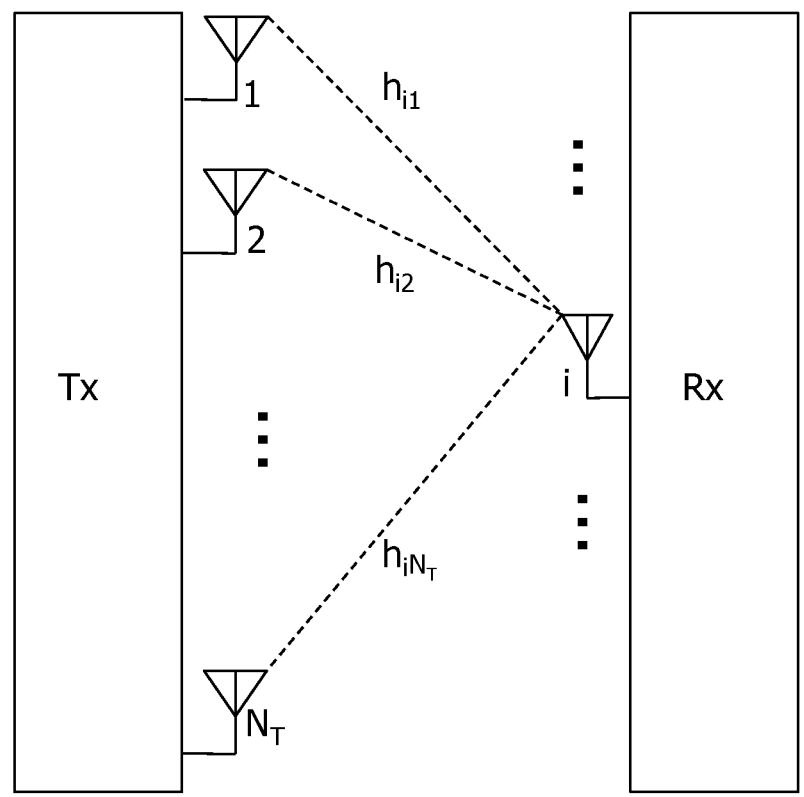
FIG. 10 illustrates an example of a channel in a multi-antenna system.

FIG. 10 illustrates an example of a channel in a multi-antenna system.

Referring to FIG. 10, channels for NT transmission antennas and reception antenna I are represented as hi1, hi2, . . . , hiNT. For convenience, such channels may be represented in a matrix or vector. Then, the channels hi1, hi2, . . . , hiNT, may be represented in a vector form as follows.

$$h_i^T = [h_{i1}, h_{i2}, \ldots, h_{iN_T}] \quad \text{[Equation 7]}$$

When a matrix representing all the channels to NR in NT transmission antennas is channel matrix H, H may be represented as in Equation 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

A signal transmitted through a transmission antenna passes through a channel as represented in Equation 8 and is then received by a reception antenna. In this case, the actual channel adds noise. The noise may be mathematically deemed an AWGN (Additive White Gaussian Noise). When AWGNs added to the reception antennas, respectively, are represented as n1, n2, . . . , nNR, the AWGNs may be represented as a vector as in the following equation.

$$n=[n_1,n_2,\ldots,n_{N_R}]^T \quad \text{[Equation 9]}$$

A reception signal vector y received by a reception antenna considering the above-described AWGN, transmission signal vector x, and channel matrix may be represented as in the following equation.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \vdots \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \quad \text{[Equation 10]}$$

$$\begin{bmatrix} n_1 \\ n_2 \\ \vdots \\ n_i \\ \vdots \\ n_{N_R} \end{bmatrix} = Hx + n$$

The numbers of rows and columns in the channel matrix H are determined depending on the numbers of transmission antennas and reception antennas. The number of rows in the channel matrix H is the same as the number of reception antennas. The number of columns in the channel matrix H is the same as the number of transmission antennas. Accordingly, the channel matrix H may be represented as a NR×NT matrix.

Generally, a rank of a matrix is defined by the smaller of the number of independent rows and the number of independent columns. Accordingly, the rank of matrix cannot be larger than the number of rows or the number of columns, and the rank of channel matrix H is determined as in the following equation.

$$\text{rank}(H) \leq \min(N_T, N_R) \quad \text{[Equation 11]}$$

Meanwhile, in LTE/LTE-A system, the Multi User-MIMO (MU-MIMO) scheme is supported in order to increase the data transmission rate, which was not supported by the conventional standard. In case that UEs of two or more users have high channel propagation gain for the same band, the MU-MIMO enables more users to use the band of which channel propagation gain is good in addition to the advantage of using wider band by permitting two users share the band, thereby increasing overall spectral efficiency.

Figure 11:
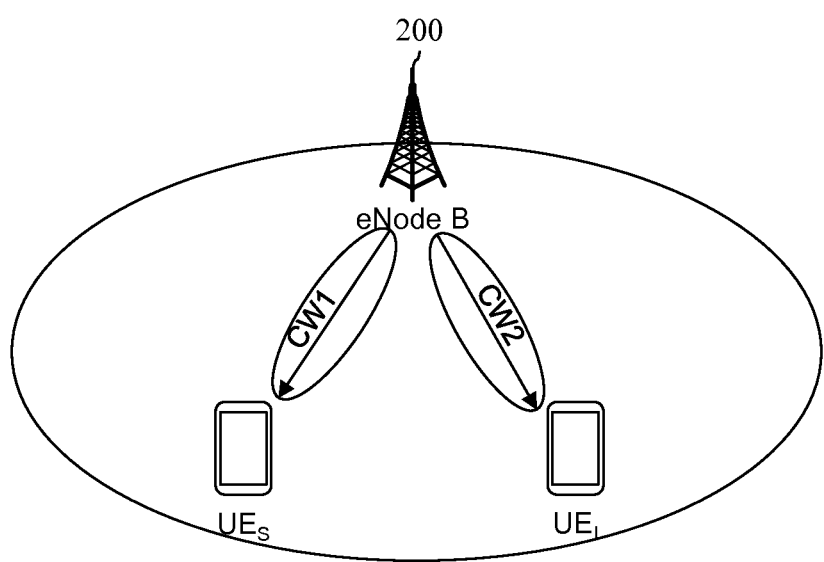
FIG. 11 illustrates the concept of Multi-user Multiple Input Multiple Output (MU-MIMO).

FIG. 11 illustrates the concept of MU-MIMO.

The MU-MIMO scheme uses maximum two pieces of Code Words (CW) for transmission, and accordingly, it is available for different UEs (e.g., depicted $UE_S$ and $UE_I$) to which each code word (CW) is allocated to simultaneously transmit data using an identical Resource Element (RE).

That is, as shown in FIG. 11, the MU-MIMO scheme enables for a cell 200 to transmit data different with each other to $UE_S$ 100a and $UE_I$ 100b through different layers using two code words (CWs) on an identical RE.

The concept of MU-MIMO is defined as transmission mode 5 represented in Table 1 in LTE. The MU-MIMO scheme supports one code word (CW) per each UE by allocating one layer, and can also be implicitly supported in LTE-A standard in transmission mode 9.

Figure 12A:
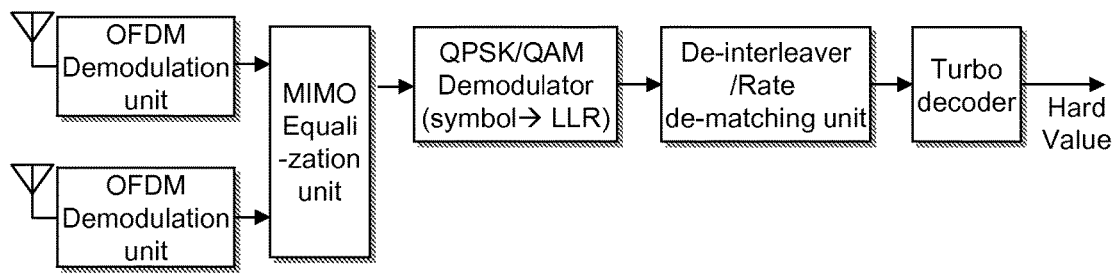
FIG. 12a is a block diagram illustrating the concept of PDSCH receiver using one code word.
Figure 12B:
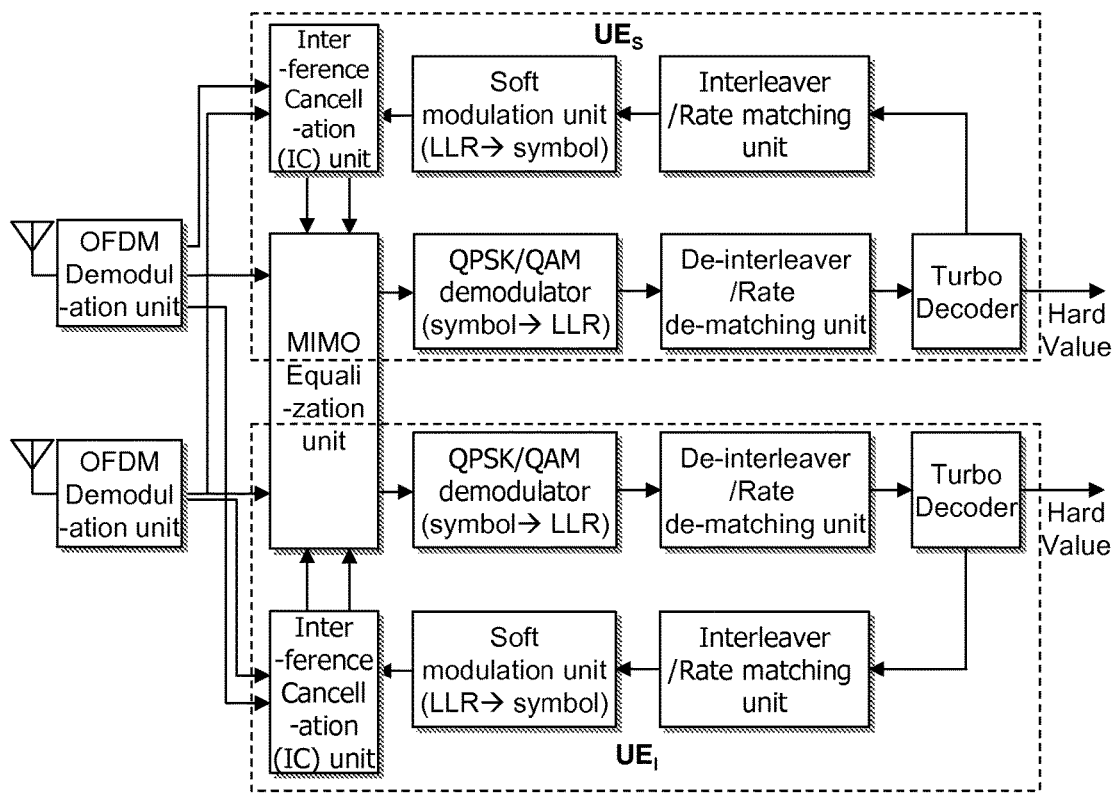
FIG. 12b is a block diagram illustrating the concept of interference cancellation receiver of the PDSCH for the MU-MIMO.

FIG. 12a is a block diagram illustrating the concept of PDSCH receiver using one code word, and FIG. 12b is a block diagram illustrating the concept of interference cancellation receiver of the PDSCH for the MU-MIMO.

The PDSCH receiver may include an OFDM demodulation unit, a MIMO equalization unit, QPSK/QAM demodulator, de-interleaver/rate de-matching unit and a turbo decoder.

Meanwhile, as shown in FIG. 12b, if the MU-MIMO is supported, the data transmitted from an identical RE to different UEs cause interference. Accordingly, an interference cancellation (IC) unit may be further included in order to remove the interference. When applying the MU-MIMO, the data are precoded by selecting a codebook such that the interference between the data transmitted from the identical UE to different UEs is minimized by a base station. However, due to the limit of a size of codebook, the interference is still partially existed, and owing to the influences by the interference, each of the UEs undergoes lowering of Signal to Interference and Noise Ratio (SINR) partially. Owing to this reason, the interference cancellation unit becomes required.

In FIG. 12b, for the convenience of description, the $UE_S$ means a UE that is to receive data from an eNodeB, and the UEI means a UE that causes interference by being allocated to identical RE to the $UE_S$.

As described above, as we can know from FIG. 12b, in comparison with the conventional receiver that requires only the receiver for the $UE_S$, a complexity increases.

Meanwhile, the DCI format which is transmitted to the PDCCH for each transmission method supported in LTE/LTE-A is as follows.

TABLE 5

| | |
|---|---|
| Single/SFBC | DCI format 1/1A |
| Closed Loop SM (Spatial Multiplexing) | DCI format 2 |
| Large delay CDD | DCI format 2A |
| MU-MIMO | DCI format 1D |
| Closed SM w/single layer | DCI format 1B |
| Dual layer beamforming | DCI format 2B |
| Transmitting maximum 8 layers | DCI format 2C/2D |

Transmission mode 5 used in the MU-MIMO uses the DCI format IDs as represented in table above, and in LTE-A standard, DCI format 2C/2D is used for transmission mode 9 used in the MU-MIMO.

The scheduling information which is commonly allocated to DCI format for receiving the PDSCH is as follows.

Resource block allocation: $\lceil \log_2(N_{RB}^{DL}(N_{RB}^{DL}+1)/2) \rceil$ bit The number of HARQ ($I_{HARQ}$): 3 bits (for FDD) and 4 bits (for TDD)

Modulation and coding scheme ($I_{MCS}$): 5 bits

New data Indicator (NI): 1 bit

Redundancy version (RV): 2 bits

In case of DCI format 1D, for the MU-MIMO support in the closed loop SM, the following information is additionally included.

TPMI information for precoding: 2 bits (2 Tx) and 4 bits (4 Tx)

Downlink power offset: 1 bit

Meanwhile, in case of DCI format 2C/2D, since maximum two transport blocks (CWs) are supported basically, each of DCI format 2C/2D is transmitted for each transport block in which MCS, NI and RV information is supported.

However, when the MU-MIMO is used, in case of the receiver of the $UE_S$ that may remove interference for the PDSCH of the $UE_I$, it is required to receive the signal of the $UE_I$. Accordingly, although the $UE_S$ is required to know the scheduling information for the $UE_I$, there is no way to know this in current standard. Accordingly, although the $UE_S$ should know the scheduling information for the $UE_I$ by blind decoding, this significantly increases the complexity/amount of calculation of the PDSCH IC in addition to the performance loss.

Accordingly, hereinafter, in order to solve the problems described above, the embodiments of the present specification will be described.

According to an embodiment of the present specification, a base station, for example, an eNodeB enables to attain increase of the reception performance and decrease of the complexity/amount of calculation by transmitting the resource allocation information for the $UE_I$ to the $UE_S$ that supports the PDSCH IC for the MU-MIMO. That is, although the interference cancellation function is added in the FeICIC, a UE should remove interference components by itself in order to remove interference. However, this is very high in complexity, in order to solve this, according to an embodiment of the present specification, the Network Assisted Interference Cancellation and Suppression (NA-ICS) is proposed.

Figure 13:
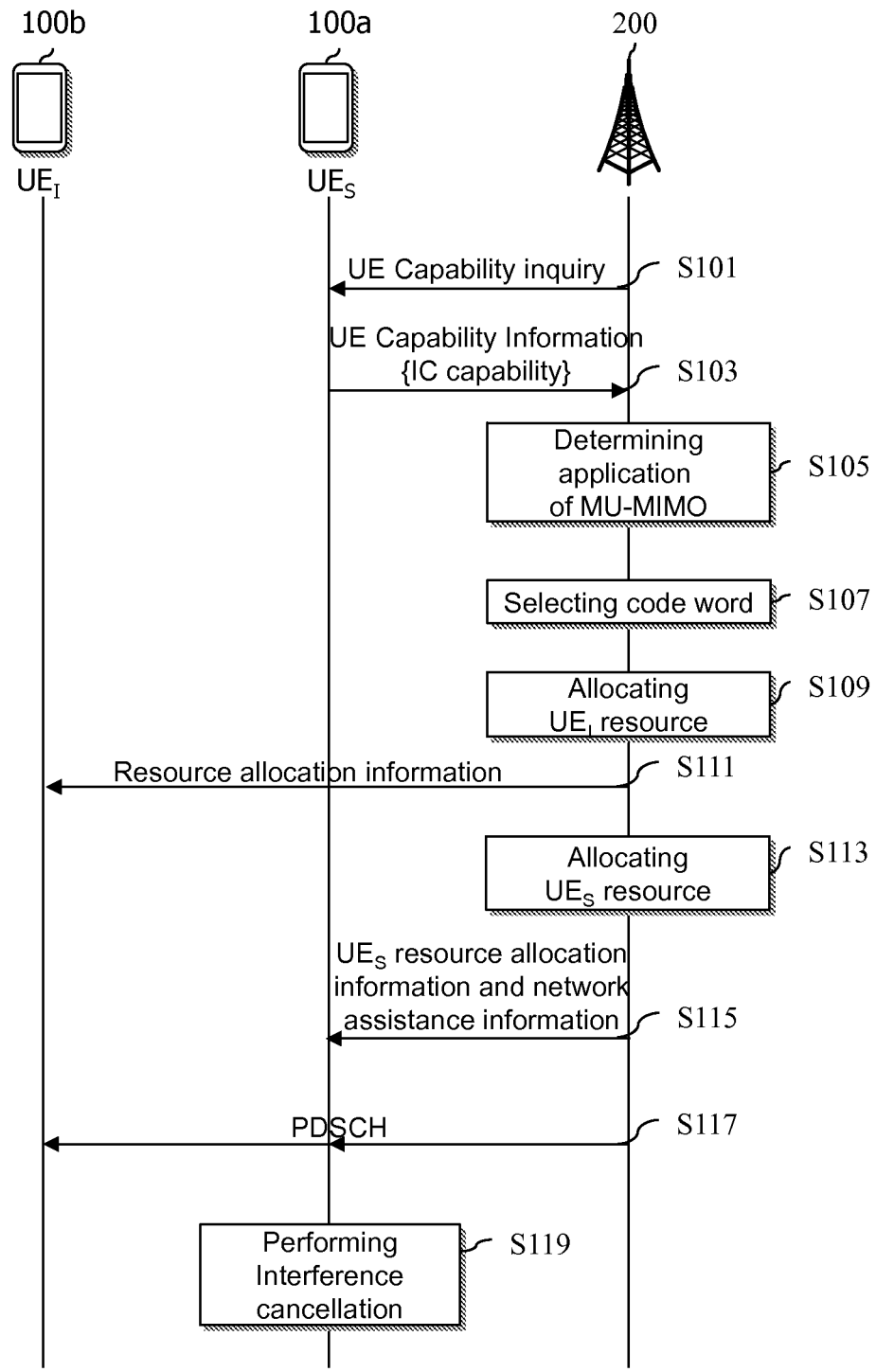
FIG. 13 is a signal flowchart illustrating a method of removing interference by a network support according to an embodiment of the present specification.

FIG. 13 is a signal flowchart illustrating a method of removing interference by a network support according to an embodiment of the present specification.

As we can know by reference to FIG. 13, an eNodeB 200 that corresponds to a serving cell requests a UE capability inquiry to a $UE_S$ 100a according to the instruction from a higher layer as occasion demands (step, S101).

Then, the $UE_S$ 100a provides UE capability information according to the request (step, S103). That is, in response to the UE capability inquiry, the $UE_S$ 100a notifies it has the interference cancellation (IC) capability to the serving cell 200 through the UE capability information. In the meanwhile, in case that a radio access capability of the $UE_S$ 100a is changed, a higher layer of the $UE_S$ 100a may instruct for a higher layer of the serving cell 200 to request the capability inquiry.

Next, the serving cell 200 determines on whether to apply the MU-MIMO (step, S105). That is, the serving cell 200 checks whether there are the $UE_S$ 100a and the $UE_I$ 100b of which mutual interference may be minimized, and determines on whether to apply the MU-MIMO.

When it is determined to apply the MU-MIMO, the serving cell 200 selects two code words that may minimize the mutual interference (step, S107).

Then, the serving cell 200 allocates a downlink resource for the $UE_I$ 100b (step, S109), and delivers resource allocation information to the $UE_I$ 100b (step, S111).

Subsequently, the serving cell 200 allocates a downlink resource for the $UE_S$ 100a (step, S113). And the serving cell 200 delivers resource allocation information to the $UE_S$ 100a. In addition, since the $UE_S$ 100a is available to remove interference, the serving cell 200 network assistance information to the $UE_S$ 100a for the PDSCH IC of the MU-MIMO (step, S115). According to an embodiment, the network assistance information may include the resource allocation information of the $UE_I$ 100b.

Here, the network assistance information for the PDSCH IC of the MU-MIMO may be changed depending on the transmission mode.

For example, in case of transmission mode 5, in order for the $UE_S$ 100a to receive the signals transmitted for $UE_I$ 100b, the network assistance information may include the following information.

TABLE 6

$n_{RNTI}$ (Radio Network Temporary Indicator)
Scheduling information ($I_{HARQ}$, $I_{MCS}$, NI, RV)
Precoding codebook index (TPMI information)
$P_A$ (Power offset)

In other example, in case of transmission mode 9, in order for the $UE_S$ 100a to receive the signals transmitted for the $UE_I$ 100b, the network assistance information may include the following information.

TABLE 7

$n_{RNTI}$ (Radio Network Temporary Indicator)
Scheduling information ($I_{HARQ}$, $I_{MCS}$, NI, RV)

As a note of caution, the network assistance information may be transmitted only when it is confirmed that the $UE_S$ 100a is available to perform IC for the PDSCH.

Meanwhile, the method of transmitting the network assistance information to the $UE_S$ 100a that is available to perform the PDSCH IC for the MU-MIMO may include several ways below.

The first method is to use an improved DCI format in order to transmit the network assistance information.

For example, DCI format 1x that improves the existing DCI format 1D is to be used. The improved DCI format 1x may include the network assistance information for the $UE_S$ 100a together with the information by the existing DCI format 1D. As other example, DCI format 2x that improves the existing DCI format 2C/2D is to be used. The improved DCI format 2x may include the network assistance information together with the information by the existing DCI format 2C/2D. Here, in case of the existing DCI format 2C/2D, since it is available to transmit the scheduling information for maximum two transmission signals, the improved DCI format 2x may include the information by the existing DCI format 2C/2D and the nRNTI information on the $UE_S$ 100a.

The second method is to notify the information on the search space of the PDCCH for the $UE_I$ 100b to the $UE_S$ 100a without transmitting the network assistance information directly to the $UE_S$ 100a. In this time, since the nRNTI on the $UE_I$ 100b and the power offset $P_A$ information is not notified through the PDCCH, according to the second method, the nRNTI on the $UE_I$ 100b and the power offset $P_A$ information may be transmitted using separate signals to the $UE_S$ 100a. According to the second method as such, if the $UE_S$ 100a receives the information on the search space of the PDCCH of the $UE_I$ 100b, the $UE_S$ 100a monitors the search space of the PDCCH of the $UE_I$ 100b in addition to its own search space. And the $UE_S$ 100a receives the PDCCH on the search space of the PDCCH of the $UE_I$ 100b, and de-scrambles it using the nRNTI.

Meanwhile, as an alternative example of the second method, if it is determined to apply the MU-MIMO since the $UE_S$ 100a and the $UE_I$ 100b in which the mutual interference between the serving cell 200 may be minimized in step, S105, the $UE_S$ 100a and the $UE_I$ 100b are grouped. And the serving cell 200 allocates $n_{RNTI}$ for a unit of the group. In this time, $n_{RNTI}$ is setup to be different between each of the UEs within the group as much as a predetermined offset. In this case, the serving cell 200 may not notify the nRNTI to the UE$_I$ 100b, different from the second method above.

As described so far, if the network assistance information is notified to a UE from a serving cell, the UE may not perform the blind decoding when performing the PDSCH IC for the MU-MIMO, thereby dramatically decreasing the complexity/amount of calculation.

The embodiments illustrated above may be implemented by various instruments. For example, the embodiments of the present invention may be implemented by hardware, firmware, software, or combinations thereof, which will be described in detail with reference to FIG. 14.

Figure 14:
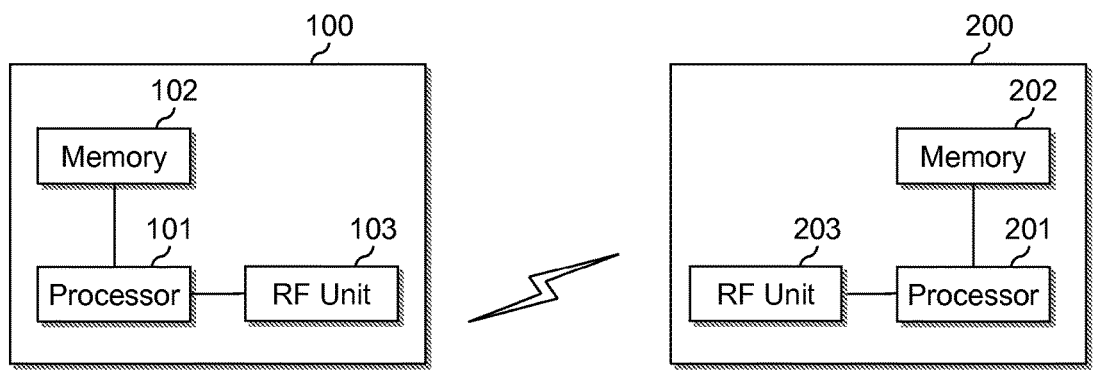
FIG. 14 is a block diagram illustrating a wireless communication system according to an embodiment of the present invention.

FIG. 14 is a block diagram illustrating a wireless communication system according to an embodiment of the present invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method for transmitting network assistance information for allowing a terminal to cancel an interference, the method performed by a serving cell and comprising:
selecting, by a serving cell, a first terminal and a second terminal to which Multi-user Multiple Input Multiple Output (MU-MIMO) is applied;
selecting, by the serving cell, code words different from each other for downlink data channels toward the first terminal and the second terminal respectively;
determining, by the serving cell, whether the first terminal supports an interference cancellation;
transmitting, by the serving cell to the first terminal, the network assistance information for allowing the first terminal to cancel the interference caused by a downlink data channel toward the second terminal, if it is determined that the first terminal supports the interference cancellation; and
not transmitting the network assistance information to the first terminal, if it is determined that the first terminal does not support the interference cancellation,
wherein the network assistance information includes information on a search space of the second terminal,
wherein the information on the search space of the second terminal is used for the first terminal to monitor a Physical Downlink Control Channel (PDCCH) of the second terminal,
wherein the network assistance information further includes a wireless network temporary identifier of the second terminal and scheduling information on the second terminal,
wherein the transmitting of the network assistance information includes determining what network assistance information to be transmitted according to a transmission mode, and
wherein if the transmission mode relates to mode 5, the network assistance information further includes precoding codebook index information of the second terminal and power offset information.

2. The method of claim 1, wherein the determining whether the first terminal supports the interference cancellation includes:
requesting a capability inquiry to the first terminal; and
receiving capability information including information on whether the first terminal supports the interference cancellation.

3. The method of claim 1, wherein the scheduling information on the second terminal includes at least one of hybrid automatic repeat request (HARQ) information, a modulation and coding scheme, a new data indicator and a redundancy version.

4. The method of claim 1, further comprising:
grouping the first terminal and the second terminal to which the MU-MIMO is to be applied; and
allocating a wireless network temporary identifier as a unit of the grouped first and second terminals,
wherein the respective wireless network temporary identifier of the first terminal and the second terminal are different as much as a predetermined offset.

5. A serving cell base station for allowing a terminal to cancel an interference, the serving cell base station comprising:
a transceiver configured to transmit and receive wireless signals; and
a processor that is configured to:
select a first terminal and a second terminal to which Multi-user Multiple Input Multiple Output (MU-MIMO) is applied,
select code words different from each other for downlink data channels toward the first terminal and the second terminal respectively,
determine whether the first terminal supports an interference cancellation, control the transceiver to transmit the network assistance information for allowing the first terminal to cancel the interference caused by a downlink data channel toward the second terminal, if it is determined that the first terminal supports the interference cancellation, and control the transceiver to not transmit the network assistance information, if it is determined that the first terminal does not support the interference cancellation, wherein the network assistance information includes information on a search space of the second terminal, wherein the information on the search space of the second terminal is used for the first terminal to monitor a Physical Downlink Control Channel (PDCCH) of the second terminal, wherein the network assistance information further includes a wireless network temporary identifier of the second terminal and scheduling information on the second terminal, wherein the processor is further configured to determine what network assistance information to be transmitted according to a transmission mode, and wherein if the transmission mode relates to mode 5, the network assistance information further includes precoding codebook index information of the second terminal and power offset information.

6. The serving cell base station of claim 5, wherein in order to determine whether the first terminal supports the interference cancellation, the transceiver is further configured to:

request a capability inquiry to the first terminal, and receive the capability information including information on whether the first terminal supports the interference cancellation.

7. The serving cell base station of claim 5, wherein the scheduling information on the second terminal includes at least one of hybrid automatic repeat request (HARQ) information, a modulation and coding scheme, a new data indicator and a redundancy version.

* * * * *